Patented Dec. 17, 1940

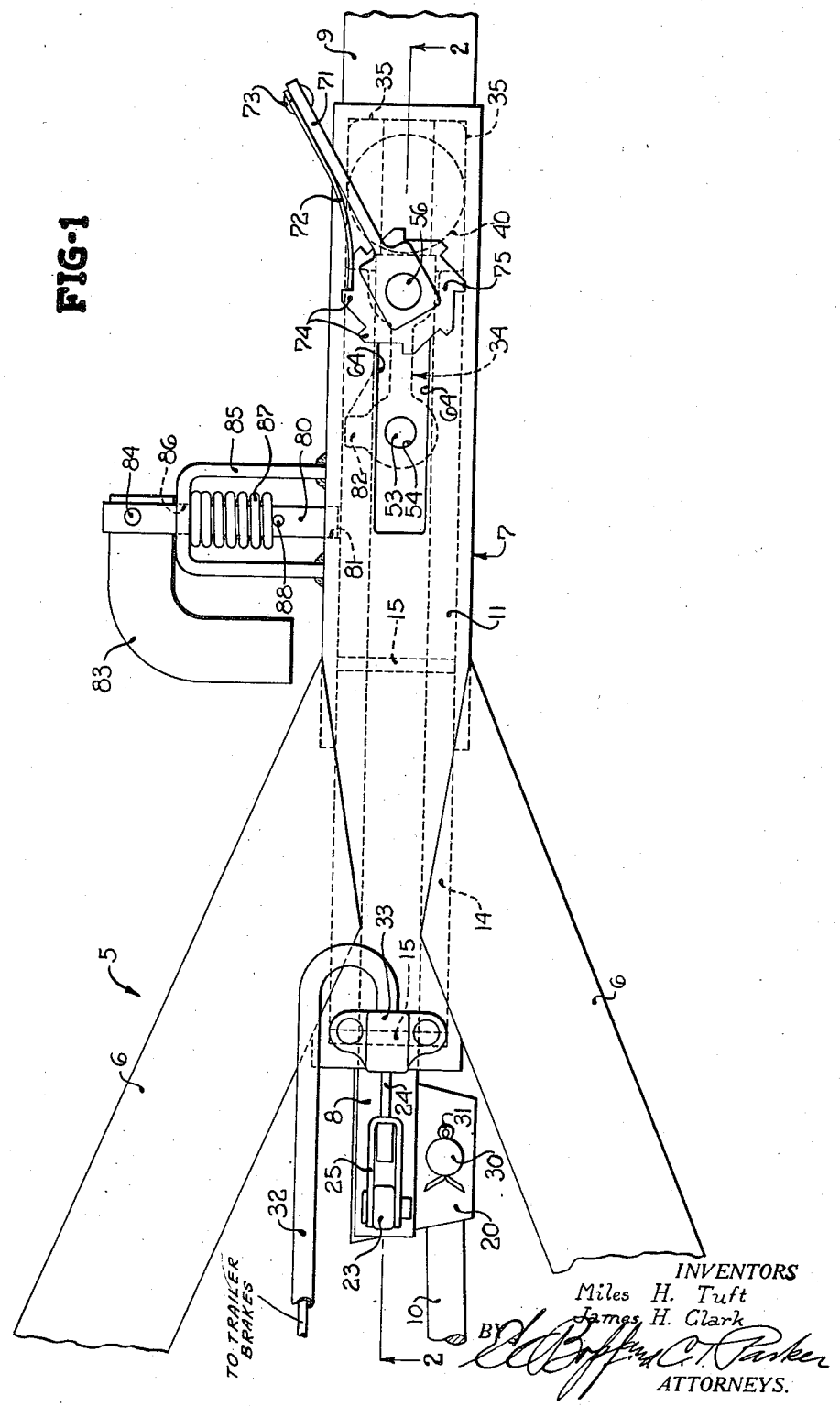

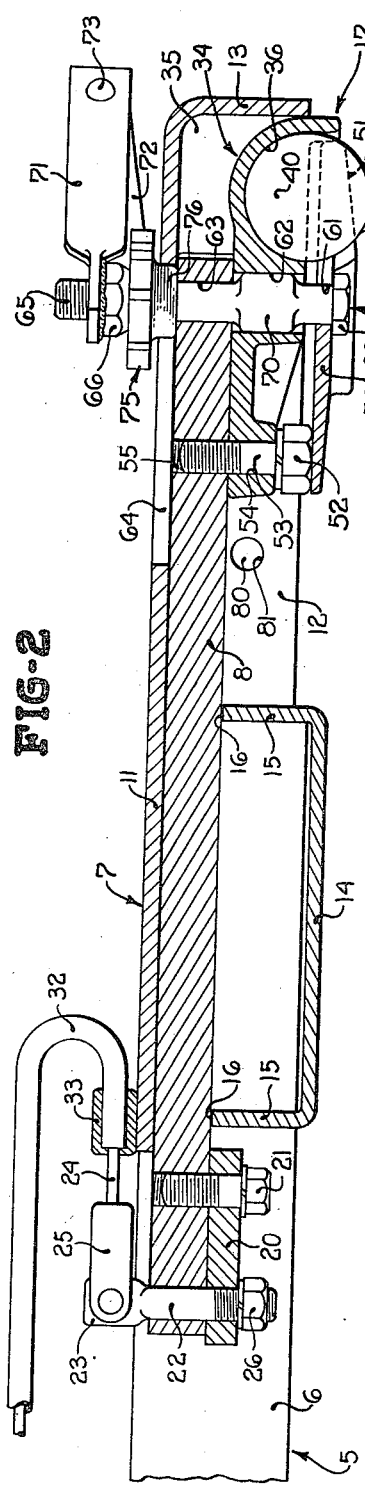
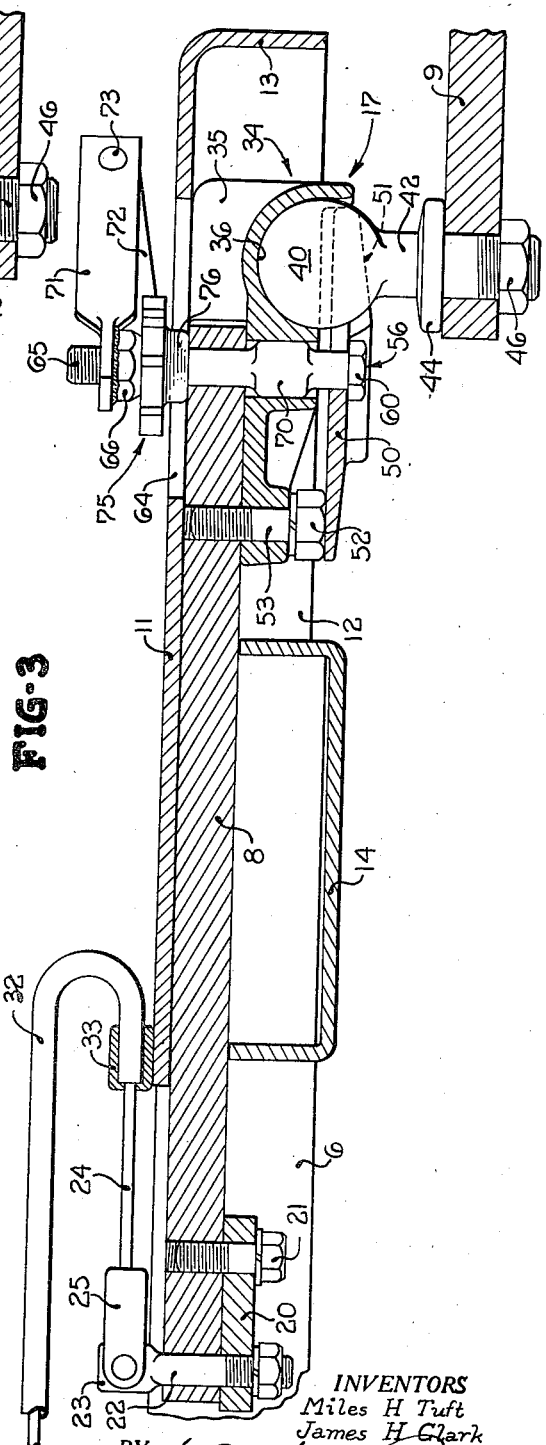

2,225,188

UNITED STATES PATENT OFFICE 2,225,188

TRAILER COUPLING

Miles H. Tuft and James H. Clark, Moline, Ill., assignors to Deere & Company, Moline, Ill., a corporation of Illinois Application June 22, 1939, Serial No. 280,434

10 Claims. (Cl. 280—33.17)

The present invention relates to trailer hitch devices of the type embodying means for automatically applying the brakes on the trailer whenever the trailer tends to overrun the towing vehicle, as when the latter is braked, and has as its principal object the provision of an improved combined hitch and brake control device that is particularly adapted for two-wheeled trailers.

Another object relates to the provision of a telescoping hitch device of this kind which is adapted to carry a portion of the load of the trailer without tending to bind during relative sliding movement of the two hitch members. We accomplish this object by supporting the tractor-connected hitch member at a point between the ends of the telescoping or overlapping portion of the hitch device, whereas it has been the custom heretofore to pivotally connect the one hitch member with the tractor at a point ahead of the telescoping portion. As is well known to those skilled in the art, there is a tendency for two telescoping members to buckle and bind when one of the members is pivotally supported at its free end, and a force is exerted on the other member perpendicular to the longitudinal axis thereof. By supporting the tractor-connected hitch member at a point intermediate of the ends of the telescoping portion, however, this buckling tendency is eliminated, and the telescoping members slide freely without undue resistance when the trailer connected hitch member is loaded.

A further object of the present invention is to provide a trailer hitch device embodying brake control means, which can be produced at low cost and which is of sturdy and simple construction.

Still another object relates to the provision of improved means for locking the securing nut in adjusted position on the ball and socket joint fastening bolt.

These and other objects and advantages of the present invention will be made apparent by a consideration of the following description of a preferred embodiment thereof, in which reference is made to the appended drawings, in which Figure 1 is a plan view of the forward portion of a trailer draft member showing a hitch device embodying the principles of the present invention;

Figure 2 is an elevational view of the hitch device taken in section along the line 2—2 of Figure 1, and showing the device in the position assumed by the parts when the tractor is exerting a towing force upon the device; and Figure 3 is a view similar to Figure 2, but in which the parts are in the positions assumed when the tractor is braked and the inertia of the trailer causes the latter to push forwardly on the hitch device to apply the trailer brakes.

Referring now to the drawings, the reference numeral 5 indicates in its entirety the draft member of a trailer preferably of the two-wheeled type in which a portion of the weight of the trailer is supported on the draft member. The draft member 5 consists of a pair of forwardly converging angle iron members 6 which are joined at their front ends to a forwardly extending inverted channel iron 7 comprising one of two telescoping hitch members. The other hitch member is indicated at 8 and consists of a bar disposed within the channel of the member 7 parallel thereto and slidable in a fore and aft direction relative to the channel iron 7. The hitch member 8 is swingably connected at its front end to the drawbar 9 of a tractor or towing vehicle by ball and socket coupling means, indicated generally by the reference numeral 17, which will be described in detail presently, and is connected at its rear end by a rearwardly extending rod 10 with suitable cushion spring means (not shown) on the trailer body. The channel iron hitch member 7 has a horizontal web portion 11 which rests upon the top surface of the hitch member 8, downwardly extending flanges 12 on either side thereof, and a vertical end flange 13 at its front end. Fixedly secured, as by welding, to the underside of the hitch member 7 near its rear end, is a U-shaped support member 14 having front and rear vertical portions 15 provided with aligned apertures 16 through which the bar 8 is freely slidable, said apertured support member serving as a guide for the bar 8 to hold the same parallel with the hitch member 7.

A laterally extending bracket plate 20 is secured to the under side of the bar 8 at the rear end thereof by means of bolts 21 and 22 extending through vertically aligned holes in the two members. Bolt 21 is threaded into its respective hole in the bar 8, with the bolt head bearing against the underside of the bracket plate 20. The head 23 of bolt 22 is disposed on top of bar 8 and is in the form of a vertically extending lug to which a flexible cable 24 is connected by a clevis 25. A nut 26 is threaded onto the lower end of bolt 22 and bears against the bracket plate 20. The front end of the rod 10 is bent upwardly, as at 30, and is passed through a suitable hole in the bracket plate 20, being secured against dropping out of said hole by a cotter pin 31. The flexible cable 24 extends forwardly from the clevis 25 and is sheathed in a flexible conduit 32 which is rigidly clamped in a fitting 33 that is bolted to the top side of the web 11. The cable 24 and its enclosing conduit are trained through an angle of 180 degrees and extend rearwardly to suitable brake actuating means (not shown) on the trailer with which the cable is operatively connected, as more completely described in an application, Serial No. 264,345, filed March 27, 1939, by Miles H. Tuft. The rear end of the conduit 32 is rigidly fixed to the trailer body by means of a suitable clamp, (not shown) in the usual manner. Hence it is seen that rearward movement of the hitch member 8 relative to hitch member 7 results in a rearward movement of the lug 23 to which the flexible cable 24 is connected, and by virtue of the 180 degree bend in the cable, a forward pull is transmitted to the brake actuating means, causing the brakes on the trailer to be applied. Such rearward movement of the hitch member 8 relative to the hitch member 7 is caused when the tractor is braked during forward operation, the inertia of the trailer setting up a compression force against the hitch member 7, tending to telescope the two hitch members 7, 8 together. In this case, the reaction of the tractor acts in a rearward direction upon the hitch member 8 through the coupling means 17, causing the hitch member 8 to move relatively rearward.

The coupling means 17, by which the hitch member 8 is connected with the tractor drawbar 9, comprises a socket member 34 in the form of a casting which is secured to the under side of the bar 8 at the front end thereof and has two laterally spaced shoulders 35 which bear against the inside surfaces of the side flanges 12 and the under side of the web 11. The socket member 34 is provided with a downwardly facing hemispherical recess 36 adapted to receive the ball 40 of a member 41, the shank 42 of the member 41 being passed through a vertical hole 43 in the tractor drawbar 9. A radial flange 44 is provided on the shank 42 and bears against the top of the drawbar, while the lower end of the shank is threaded at 45 to receive a nut 46 which is adapted to be drawn up against the bottom of the drawbar. The ball 40 is held in the recess 36 by a forked retainer 50 having forwardly extending, upwardly concave prongs 51 which engage the under side of the ball on either side of the shank 42. The rear end or heel of the retainer 50 bears against the head 52 of a bolt 53 which extends upwardly through an aperture 54 in the socket member 34 and is screwed into a threaded aperture 55 in the bar 8.

The retainer 50 is clamped against the ball 40 and bolt head 52 by means of a vertical bolt 56 having a head 60 at the lower end thereof which bears against the under side of the retainer, the shank of said bolt extending upwardly through aligned apertures 61, 62, 63 in the retainer 50, socket member 34 and bar 8, respectively, and projecting through a longitudinally extending slot 64 provided in the web 11 of the hitch member 7. The upper end of the bolt 56 is threaded at 65 to receive a nut 66, which serves to clamp the members together and which is prevented from turning by locking means to be described shortly.

The aperture 61 is preferably in the form of a slot extending rearwardly from the bight of the forked portion of the retainer and allows the retainer to be withdrawn rearwardly out of engagement with the ball 40 when the bolt 56 has been loosened, enabling the ball to be quickly seated in or removed from the socket 36. The aperture 62 is preferably oblong in plan and is adapted to receive a cooperating enlarged oblong portion 70 of the bolt shank to prevent the bolt 56 from turning relative to the socket member 34.

The locking means mentioned above consists of a lever or bar 71, fixed, as by welding, to the top of the nut 66 and extending laterally outward therefrom. A leaf spring detent 72 is pivotally connected to the outer end of the bar 71 by a pin 73 and extends inwardly therefrom to engage ratchet teeth 74 on a locking member 75, said spring detent being swingable vertically into and out of engagement with the ratchet teeth. When the detent 72 is in engagement with the ratchet teeth 74, the nut 66 is locked against turning back off the threads 65 relative to the member 75, while the latter is held against turning by means of a square hub 76 disposed within the slot 64 and having sliding engagement with the sides thereof. From the foregoing, it is seen that the locking member 75 provides an effective means for locking the nut against turning, and at the same time allows the bolt 56 to move freely along the length of the slot 64.

The brake actuating mechanism can be locked out entirely, if desired, by means of a pin 80 which can be inserted through an aperture 81 in the flange 12 of hitch member 7 so as to project into the path of a stop lug 82 provided on the adjacent side of the socket member 34 and thereby limit the rearward movement of hitch member 8 relative to hitch member 7. The pin is normally held in retracted position by a toggle lever 83 to which the pin is pivoted by a bolt 84, but can be inserted by pulling the lever 83 outwardly. The toggle lever 83 is supported on a U-shaped bracket 85 welded to the side flange 12 of the draft member 7 and having an aperture 86 through which the pin extends. A spring 87 acts in compression to hold the toggle lever 83 down against the bracket 85, and the reaction of the spring is taken by a stop 88 fixed to the pin 80.

In operation, the trailer draft member 5 carries a portion of the weight of the trailer and load, and such load is carried almost entirely on the shoulders 35 of the socket member 34, which shoulders are disposed directly above the ball 40. Because of the fact that the hitch members 7, 8 are supported on a flexible connection disposed between the ends of their telescoping portions, there is no bending moment set up in the telescoping hitch members, and therefore no tendency for the parts to bind when heavily loaded.

What we claim as our invention and desire to secure by Letters Patent is:

1. In a trailer hitch device comprising a pair of telescoping draft members, one of said members being fixedly connected with a trailer, means for flexibly connecting the other draft member with a tractor including a socket member adapted to be fixed to said other draft member, a ball fixed to the tractor and adapted to be received by said socket member, a retainer adapted to engage said ball and hold the same in engagement with said socket member, a bolt extending through said retainer, socket member and other draft member, a ratchet member embracing said bolt and bearing against said other draft member opposite said socket, said ratchet member having means restraining it from turning relative to said other draft member, a nut threaded onto said bolt and adapted to bear against said ratchet member, for drawing said retainer member firmly against said ball, an arm fixed to said nut, and a spring detent pivotally connected with said arm for movement into and out of engagement with said ratchet to releasably lock said nut against turning relative thereto.

2. In combination, a pair of cooperative draft members slidable longitudinally relative to each other, one of said members having a longitudinally extending slot formed therein, coupling means adapted to be connected with the other of said members, a fastening bolt extending through aligned apertures in said coupling means and other draft member and projecting through said slot, means for preventing said bolt from turning relative to said draft members, a nut threaded on the projecting end of said bolt, and means for holding said nut against turning including a locking member embracing said bolt and having a polygonal hub portion adapted for sliding but non-rotating fit within said slot, ratchet teeth on said locking member, and a detent carried by said nut and movable into and out of engagement with said ratchet teeth.

3. A trailer hitch device comprising a fore and aft extending inverted channel draft member, adapted to be fixed to a trailer vehicle, a bar disposed within the channel of said draft member and slidable lengthwise therein, a U-shaped support having arms fixed to said draft member and extending up into the channel to provide spaced bearing supports for the rear end of the bar, and a flexible coupling member fixed to the front end of the bar and having bearing portions slidably engaging the side surfaces of the draft member, said coupling member being adapted for connection with a draft vehicle.

4. A trailer hitch device comprising a channel member adapted to be fixed to a trailer vehicle, a U-shaped support having arms fixed to and extending into said channel member, said arms having aligned apertures formed therein, a bar slidably disposed within said channel and extending through the apertures in said arms, a coupling member fixed to one end of said bar and having laterally spaced shoulders slidably engaging the sides of the channel member, control means connected between said bar and said channel member and actuated by relative movement therebetween, a stop lug formed on said coupling member, and a plunger carried on the outside of said channel member and movable through an aperture in the side wall thereof to a position of engagement with the stop lug for limiting movement of the bar in one direction relative to the channel member.

5. A trailer hitch device comprising a pair of overlapping draft members disposed one above the other and longitudinally slidable relative to one another, the upper draft member being adapted to be rigidly fixed at one end to a trailer vehicle and having a longitudinally extending slot in the other end thereof, a detachable coupling carried on the under side of the lower draft member between the ends of the overlapping portion and adapted for detachably securing the lower draft member to a hitch connection on a towing vehicle, said coupling comprising an element fixed to the lower draft member and a retainer movable vertically with respect to the element for clamping the hitch connection therebetween, a bolt extending through vertically aligned holes in the retainer, coupling element, and lower draft member and through the slot in said upper draft member, and means carried at the upper end of said bolt and slidably disposed within said slot for drawing said retainer toward said coupling element.

6. A trailer hitch device comprising a pair of telescoping draft members, one of said draft members being adapted for rigid connection with a trailer vehicle, and means for flexibly connecting the other draft member to a towing vehicle comprising a pair of cooperating coupling elements, a retainer carried on one of the coupling elements and engageable with the other for securing the elements together, a bolt extending through aligned apertures in said retainer, said one coupling element and said other draft member, a nut threaded on the upper end of said bolt, locking means embracing the bolt between the nut and said other draft member, and means on said nut movable into and out of engagement with said locking means for releasably holding the nut against turning in one direction.

7. A trailer hitch device comprising a pair of telescoping draft members, one of said draft members being adapted for rigid connection with a trailer vehicle, and means for flexibly connecting the other draft member to a towing vehicle comprising a pair of cooperating coupling elements, a retainer carried on one of the coupling elements and engageable with the other for securing the elements together, a bolt extending through aligned apertures in said retainer, said one coupling element and said other draft member, a nut threaded on the upper end of said bolt, a locking member embracing the bolt and engaging said one draft member for sliding but non-rotating motion, and means on said nut engageable with said locking member for holding the nut against turning in one direction.

8. A trailer hitch device comprising a pair of telescoping draft members, one of said draft members being adapted for rigid connection with a trailer vehicle, and means for flexibly connecting the other draft member to a towing vehicle comprising a pair of cooperating coupling elements, a retainer carried on one of the coupling elements and engageable with the other for securing the elements together, a bolt extending through aligned apertures in said retainer, said one coupling element and said other draft member, a nut threaded on the upper end of said bolt, a locking member connected with said bolt and movable therewith relative to said one draft member, and a detent pivoted on said nut for swinging movement into and out of engagement with said locking member for holding the nut against turning.

9. A trailer hitch device comprising a pair of telescoping draft members, one of said draft members being adapted for rigid connection with a trailer vehicle at one end, and having a slot adjacent the other end, and means for flexibly connecting the other draft member to a towing vehicle comprising a pair of cooperating coupling elements, a retainer carried on one of the coupling elements and engageable with the other for securing the elements together, a bolt extending through aligned apertures in said retainer and said one coupling element and through the slot in said one draft member, a nut threaded on the upper end of said bolt, a locking member embracing the bolt and engaging the sides of said slot in said one draft member for sliding but non-rotating motion, and means on said nut engageable with said locking member for holding the nut against turning in one direction.

10. In a trailer hitch device comprising a draft member, means for flexibly connecting the draft member with a tractor including a socket member fixed to said draft member, a ball adapted to be attached to the tractor and receivable by said socket member, a retainer adapted to engage said ball and hold the same in engagement with said socket member, a bolt extending through said retainer and socket member, a ratchet member embracing said bolt and bearing against said draft member opposite said socket, said ratchet member having means restraining it from turning relative to said draft member, a nut threaded onto said bolt and adapted to bear against said ratchet member for drawing said retainer member firmly against said ball, an arm fixed to said nut, and a spring detent pivotally connected with said arm for movement into and out of engagement with said ratchet to releasably lock said nut against turning relative thereto.

MILES H. TUFT.
JAMES H. CLARK.